(12) United States Patent
Tegtmeier

(10) Patent No.: US 10,231,388 B2
(45) Date of Patent: Mar. 19, 2019

(54) APPARTUS FOR PROTECTING COLD SENSITIVE SCIONS

(71) Applicant: HiberVine, LLC, Manhattan, KS (US)

(72) Inventor: David H. Tegtmeier, Manhattan, KS (US)

(73) Assignee: Hibervine LLC, Manhattan, KS (US)

( * ) Notice: Subject to any disclaimer, the term of this patent is extended or adjusted under 35 U.S.C. 154(b) by 196 days.

(21) Appl. No.: 15/142,866

(22) Filed: Apr. 29, 2016

(65) Prior Publication Data

US 2016/0316642 A1    Nov. 3, 2016

Related U.S. Application Data

(60) Provisional application No. 62/154,848, filed on Apr. 30, 2015.

(51) Int. Cl.
| | | |
|---|---|---|
| *A01G 13/02* | (2006.01) | |
| *A01G 17/06* | (2006.01) | |
| *A01G 17/02* | (2006.01) | |

(52) U.S. Cl.
CPC ....... *A01G 13/0237* (2013.01); *A01G 13/025* (2013.01); *A01G 17/06* (2013.01); *A01G 17/02* (2013.01)

(58) Field of Classification Search
CPC .... A01G 17/04; A01G 17/06; A01G 13/0237; A01G 13/025; A01G 17/02; A01B 39/16
USPC ...... 47/1.01 R, 1.01 S, 58.1 R; 405/179, 183
See application file for complete search history.

(56) References Cited

U.S. PATENT DOCUMENTS

| | | | |
|---|---|---|---|
| 156,097 | A | 10/1874 | McDonald |
| 341,088 | A | 5/1886 | Wilson |
| 2,944,788 | A | 7/1960 | Schaefer |
| 3,197,919 | A | 8/1965 | Pasztor |

(Continued)

FOREIGN PATENT DOCUMENTS

| | | |
|---|---|---|
| CA | 2509278 | 7/2006 |
| CN | 201185556 | 12/2007 |

(Continued)

OTHER PUBLICATIONS

Patent CN103120111B—Method suitable for northern grape horizontal connected trellis cultivation—Google Patents machine translation.

(Continued)

*Primary Examiner* — David J Parsley
*Assistant Examiner* — Danielle A Clerkley
(74) *Attorney, Agent, or Firm* — Daniel J. Coughlin; Coughlin Law Office LLC

(57) ABSTRACT

This disclosure involves advancements in grafting, trellis design, and an implement to raise and lower cold-sensitive vines between a raised growing position and a lowered position where the vine is buried in a trench and covered to protect it from the cold. The implement relieves the operator from the otherwise laborious task of protecting the cold sensitive vines. The apparatus allows the cold-sensitive vine to be buried into a trench without removing the vine from the fruiting wire. The implement directs the fruiting wire with a vine cordon attached thereto into a trench to protect the cordon from cold temperatures. The apparatus causes the vine trunk to bend to accommodate the position of the vine cordon.

11 Claims, 6 Drawing Sheets

(56) References Cited

U.S. PATENT DOCUMENTS

| | | | |
|---|---|---|---|
| 3,813,888 A * | 6/1974 | Purviance | E02F 5/102 405/180 |
| 3,955,626 A | 5/1976 | Taylor | |
| 4,023,307 A | 5/1977 | Clark et al. | |
| 4,270,581 A | 6/1981 | Claxton et al. | |
| 4,341,268 A | 7/1982 | Hugg | |
| 4,539,765 A | 9/1985 | Reece | |
| 4,567,689 A | 2/1986 | Lemons | |
| 4,655,639 A * | 4/1987 | Reece | E02F 5/106 37/367 |
| 4,661,019 A | 4/1987 | McLaughlin | |
| 4,703,584 A | 11/1987 | Chazalnoel | |
| 4,871,281 A * | 10/1989 | Justice | E02F 3/10 37/353 |
| 5,337,514 A | 8/1994 | Hiyama et al. | |
| 5,438,795 A | 8/1995 | Galbraith | |
| 5,797,214 A | 8/1998 | Parrish et al. | |
| 6,016,626 A | 1/2000 | Auer et al. | |
| D441,105 S | 4/2001 | Cleary | |
| 6,374,538 B1 * | 4/2002 | Morris | A01D 46/28 47/1.01 R |
| 6,454,244 B1 | 9/2002 | Coulson | |
| 6,578,318 B1 | 6/2003 | Clark | |
| 6,922,942 B2 | 8/2005 | Stefanutti | |
| 7,652,766 B2 | 1/2010 | Pellenc | |
| 7,937,888 B2 | 5/2011 | Arief et al. | |
| 8,225,547 B2 | 7/2012 | DeBruin | |
| 8,322,123 B2 | 12/2012 | George et al. | |
| 8,540,217 B2 | 9/2013 | Olsson et al. | |
| 8,752,483 B2 | 6/2014 | Schmitt | |
| 2003/0033749 A1 | 2/2003 | Morris et al. | |
| 2004/0026678 A1 | 2/2004 | Vandergriff | |
| 2005/0252076 A1 | 11/2005 | Schloesser et al. | |
| 2009/0293353 A1 | 12/2009 | Arief et al. | |
| 2012/0227318 A1 | 9/2012 | Harger | |
| 2013/0042525 A1 | 2/2013 | Bortolussi et al. | |
| 2013/0118069 A1 | 5/2013 | Hunt et al. | |
| 2013/0333283 A1 | 12/2013 | Patterson, Sr. | |

FOREIGN PATENT DOCUMENTS

| | | |
|---|---|---|
| CN | 103766025 | 10/2010 |
| CN | 201898703 | 12/2010 |
| CN | 202396149 | 12/2011 |
| CN | 103503731 | 6/2012 |
| CN | 202759754 | 8/2012 |
| CN | 103650671 | 9/2012 |
| CN | 203340542 | 2/2013 |
| CN | 103120111 | 3/2013 |
| EP | 0141469 | 1/1984 |
| FR | 2770966 | 11/1997 |
| FR | 2770966 | 5/1999 |
| WO | 2004107847 | 6/2004 |

OTHER PUBLICATIONS

Patent CN103503731A—Vine cover—Google Patents machine translation.
Patent CN103650671A—Circulating grape vine burying machine—Google Patents machine translation.
Patent CN103766025A—Collator—Google Patents machine translation.
Patent CN201898703U—Universal grapevine burying machine—Google Patents machine translation.
Patent CN202396149U—Grape cold-proof vine burying machine—Google Patents machine translation.
Patent CN203340542U—Walking grape vine burying machine—Google Patents machine translation.
Patent CN202759754U—Grape vine burying machine.
Patent CN201185556Y—Micro-plowing vine-burying multipurpose machine.
Duarte Trees & Vines—http://www.duartenursery.com/grapevines/ website print out.
RCA Trellis System, Trellis Growing Systems, 2017.

* cited by examiner

APPARTUS FOR PROTECTING COLD SENSITIVE SCIONS

CROSS-REFERENCES

This application claims the benefit of U.S. Provisional Application No. 62/154,848, filed Apr. 30, 2015.

FIELD

This disclosure generally relates to horticulture and for protecting cold sensitive scions.

BACKGROUND

The best winemaking grapes are grown on vines that are too cold sensitive to be grown in many regions of the world. The general practice is to grow less cold sensitive varieties in these regions. It is possible, however, to graft a scion of a cold sensitive vine unto a cold tolerant rootstock. The scion grows up to a fruiting wire. The scion is attached to and supported by the fruiting wire. In order to prepare for cold temperatures, the cold-sensitive portion of the vine is insulated, heated, or removed from the fruiting wire and buried.

SUMMARY

I recognized that the laborious process of removing the scion from the fruiting wire to be buried could be more efficiently accomplished by grafting the more cold-sensitive scion onto the rootstock near the height of the fruiting wire. The rootstock is grown at an acute angle relative to the ground, so that the rootstock can be bent over. In the tall rootstock configuration, only the less cold-sensitive rootstock is exposed to the cold temperatures.

I also recognized that a trellis post comprising a pivot arm would allow the cold-sensitive scion to be buried without removing the scion from the fruiting wire. In this configuration, the pivot arm, fruiting wire, and cold-sensitive scion rotate toward the ground and the fruiting wire and scion can be buried together in a trench in the ground. This protects the vulnerable scion wood from cold temperatures without requiring the laborious step of removing the scion from the fruiting wire. A further benefit is that both the fruiting wire and the scion can be pulled up from the trench in the spring without requiring careful digging of the scion wood.

I also recognized a simple mechanism for maintaining the position of the pivot arms. Each trellis post—the end trellis posts and the central trellis posts—has a first support member. The pivot arm has a second support member. When the fruiting wire is received by both the first support member and the second support member, the pivoting arm is secured in a substantially upright position. Alternatively, when the fruiting wire is removed from the first support member of the end post the pivot arm is capable of rotating toward the ground. The central trellis posts—which are disposed in a line between the two end trellis posts—have a single support member for receiving and supporting the weight fruiting wire.

I also recognized that the process of moving the fruiting wire with the vine cordon attached thereto into the trench could be accomplished with a lowering implement. The lowering implement receives a portion of the fruiting wire and directs the fruiting wire into the trench.

The lowering implement is disclosed in multiple embodiments. The lowering implement can have a frame with a first line guide connected to the frame and can be configured to receive and guide the fruiting wire upward. A second line guide—also connected to a frame—can receive and guide the fruiting wire downward. This implement could be mounted to a tractor and driven alongside the fruiting wire.

Alternatively, an embodiment of the lowering implement has an elongated conduit for directing the fruiting wire into the trench. The elongated conduit has an arcuate cross section, with an open portion. The open portion allows the vine trunk to slide therethrough. The first longitudinal end of the elongated conduit receives the fruiting wire. The second longitudinal end of the elongated conduit discharges the fruiting wire into the trench.

In the fall—when the fruiting wire with the scion attached needs to be buried—the fruiting vines that extend vertically upwards from the fruiting wire can be cut from the portion of the vine that is attached to the fruiting wire. The fruiting wire is removed from the support member that is on the first end trellis post. This allows the pivot arm to pivot downward toward the ground at an obtuse angle relative to the central post.

The lowering implement is attached to a tractor. The lowering implement's first line guide receives the fruiting wire. The first line guide can remove the wire from the support member. The second line guide receives the fruiting wire and guides the wire toward the ground. As the tractor drives along the length of the fruiting wire, the wire passes over the first raised line guide and the wire descends to the second line guide.

The second line guide guides the fruiting wire into a trench in the ground. The trench is generally parallel to the fruiting wire. The trench can be created by attaching a disc or plough to the implement's frame or can be created using standard equipment. A blade can be attached to the implement, to fill the trench and cover the fruiting wire with the cold-sensitive vine portion attached.

In the spring—when the fruiting wire with the scion attached needs to be lifted—the first end trellis post with the pivot arm is returned to a substantially upright position. A raising implement is attached to a tractor. The raising implement has a raising line guide that receives the fruiting wire and lifts the fruiting wire—with the scion attached—from its buried position. The raising line guide has a lower end and an upper end. As the tractor drives along the length of the fruiting wire, the wire passes through the raising line guide from the lower end and is lifted to the raised end. The second line guide is generally disposed at or near the height of the support members of the central trellis posts. As such, the implement lifts the fruiting wife from its buried position and guides the fruiting wire onto the support members of the central trellis posts. The raising line guide is mounted to the tractor at an angle so that the lower end is positioned near the buried fruiting wire and the raised end is positioned near the trellis posts.

It is also contemplated that the raising implement could have a first line guide and a second line guide. The second line guide is positioned higher than the first line guide. As the tractor drives along the length of the fruiting wire, the wire passes over the first raised line guide and is lifted to the second line guide. The second line guide is generally disposed at or near the height of the support members of the central trellis posts. As such, the implement lifts the fruiting wife from its buried position and guides the fruiting wire onto the support members of the central trellis posts.

I also recognized that the implement could an excavating assembly capable of forming the trench. The excavating assembly is attached to the frame in a position leading the second line guide. In this way, the tractor can form the trench and lower the fruiting wire into the trench in a single pass. In a similar manner, the implement could also comprise a backfill assembly configured to cover the fruiting wire with soil. The backfill assembly is either attached to the frame in a position following the second line guide or could be physically separate and attach to the rear end of the tractor.

I also recognized that by planting the rootstock at an acute angle relative to the ground, the high grafted trunk can be more easily lowered into the trench. Rootstocks are generally planted at approximately a 90° angle to the ground. By planting the rootstock at an acute angle relative to the ground, the stress of bending the vine toward the ground is reduced and the scion can remain attached to the fruiting wire as the pivot arm, fruiting wire, and scion rotate together into a trench in the ground. In this way, the cold-sensitive scion can be protected from cold temperatures by being covered without introducing stress upon the rootstock at the ground level.

BRIEF DESCRIPTION OF DRAWINGS

Aspects are illustrated by way of example, and not by way of limitation, in the accompanying drawings, wherein.

DETAILED DESCRIPTION

The system for growing cold sensitive vines—or more specifically, cold sensitive scions—involves advancements in grafting, trellis design, and an implement to relieve the operator from the laborious task of protecting the cold sensitive vines.

As used herein, fruiting wire means the horizontal wire for supporting the vine that extends between the end posts of a trellis. The fruiting wire is generally held taut between the end posts. As used herein, cordon means the portion of a vine trained to grow on a fruiting wire.

Figure 1:
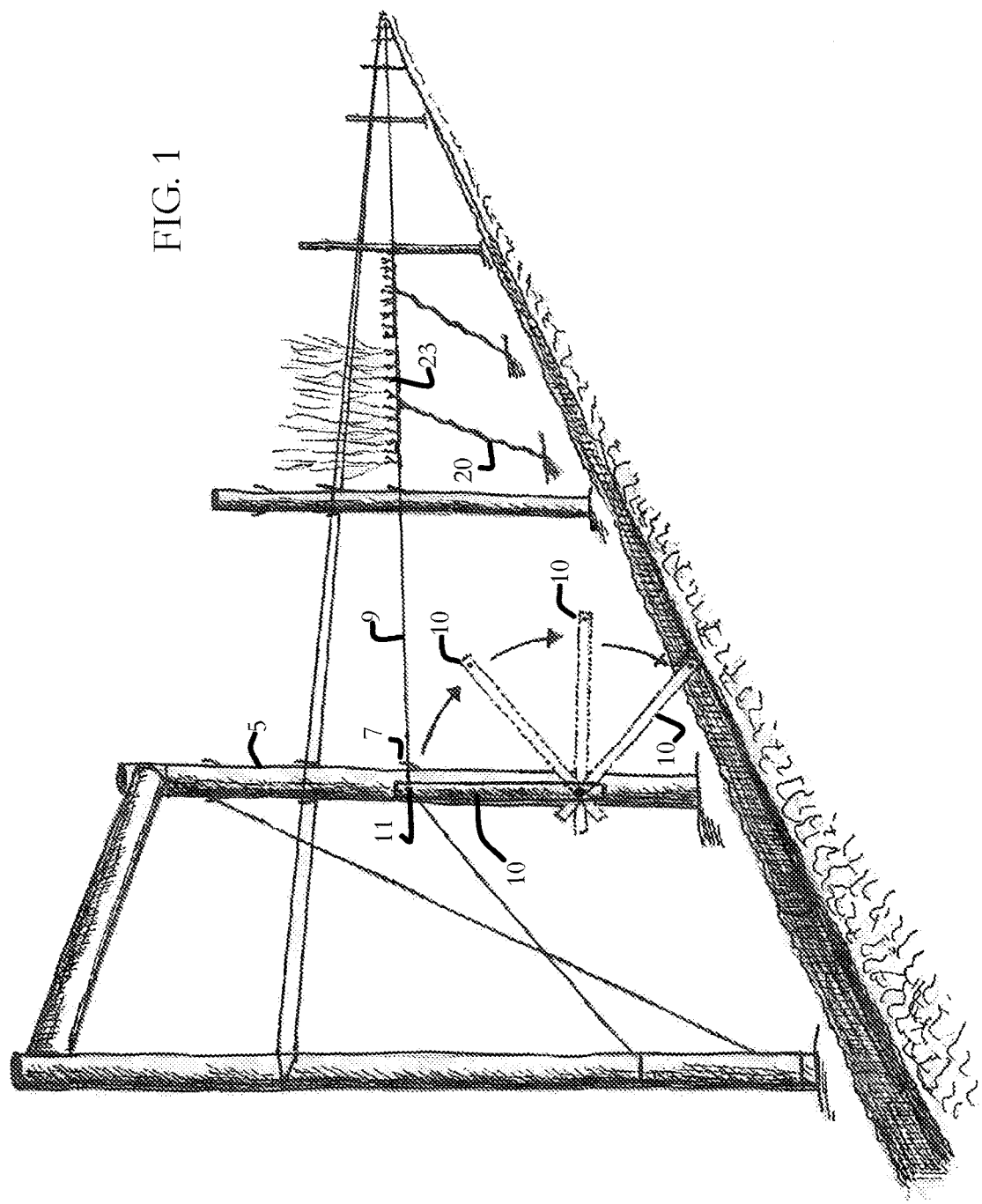
FIG. 1 depicts a trellis with a pivoting trellis arm and trench for burying a portion of the vine.

The trellis design allows the fruiting wire to be dropped to the ground without removing the vine from the fruiting wire. The trellis design incorporates an end post 5 that is anchored to the ground and substantially upright. The end post has a first support member 7 for receiving a fruiting wire 9. The end post also has a pivot arm 10 that is pivotally attached to the end post, so that the pivot arm can rotate from a substantially upright position to a position that is at an obtuse angle relative to the central post, as shown in FIG. 1. The pivot arm 10 has a second support member 11 for receiving the fruiting wire. The pivot arm 10 is secured in a substantially upright position when the fruiting wire is received by both the first support member of the end post and the second support member of the pivot post. The pivot arm is able to pivot freely when the fruiting wire is removed from the first support member of the end post. The pivot arm is able to rotate toward the ground, allowing the fruiting wire to be buried without removing the vine.

The vine has a trunk portion and a cordon portion. The vine cordon can be a cold-sensitive scion portion 23 of the vine needs to be protected. The cordon portion can be a cold-tolerant rootstock portion 20 of the vine that can remain exposed to the cold. The cold-tolerant rootstock portion 20 extends between the ground and the fruiting wire. In the fall, the cold-sensitive scion portion 23 can be buried and the cold-tolerant rootstock portion 20 can remain exposed to the cold temperatures. The elevated grafting position means that there is a longer trunk to facility bending the vine trunk from the elevated position to the buried position. In this way, a cold-tolerant rootstock portion 20 remains exposed to the cold, even when the cold-sensitive scion portion 23 is buried. The cold-sensitive scion portion 23 remains secured to the fruiting wire. The cold-sensitive scion portion 23 is preferably grafted at a height of three feet above the ground. In another embodiment, the graft is made at approximately the same height as the fruiting wire.

The process of raising and lowering the fruiting wire and vine can be mechanized using an implement 100 described below. The implement has a frame 110 with a mounting bracket 115 for mounting the apparatus to a tractor or skid steer. The implement also has a lowering guide 120 mounted to the frame 110.

The apparatus can be used to bury a longitudinally extended fruiting wire with a vine cordon attached thereto in a trench with the vine trunk remaining attached to the vine cordon. The apparatus receives a first portion of the fruiting wire with the vine cordon attached thereto into the apparatus. Then the apparatus bends the vine trunk such that the first portion of the fruiting wire and vine cordon is positioned into the trench. The fruiting wire and vine cordon can slide through an elongated conduit extending between a first longitudinal end and a second longitudinal end. The vine trunk can also slide through an open pathway extending along a longitudinal portion of the apparatus as the fruiting wire and cordon travel through the conduit. The apparatus then buries the fruiting wire and vine cordon into the trench. The apparatus can also be configured to first excavate the trench.

Figure 2:
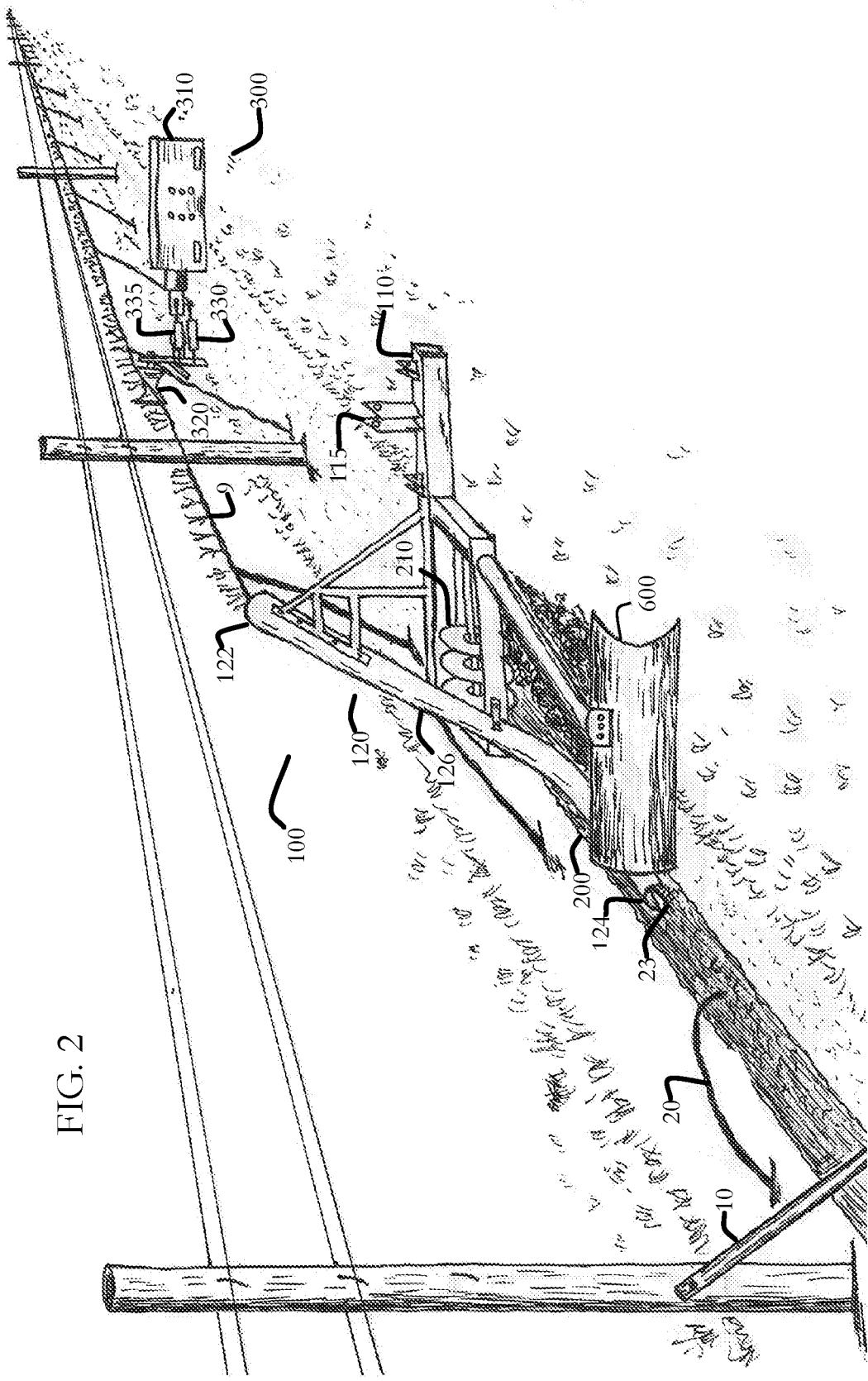
FIG. 2 depicts a top rear perspective of an embodiment of the implement for burying fruiting wire with the vine portion attached thereto.

The lowering guide 120 is mounted to the frame. The frame comprises a mounting bracket 115 for attaching the implement 100 to a tractor or skid steer. For example, the mounting bracket 115 can be configured as illustrated in FIG. 2 to be mounted to the three-point hitch portion of a tractor. Alternatively, the mounting bracket can be configured to mount to a front-end loader or a skid steer attachment mount plate.

The lowering guide 120 has a first longitudinal end 122 and a second longitudinal end 124. The first longitudinal end is configured to receive a first portion of the fruiting wire and cordon. The first longitudinal end 122 continues to receive subsequent portions of the longitudinally extended fruiting wire 9 as the tractor moves the implement along the trellis.

The fruiting wire—with vine cordon attached thereto—passes along the longitudinal wire pathway as the implement is moved along the trellis. The fruiting wire—with vine cordon attached thereto—is discharged from the lowering guide 120 at the second longitudinal end 124. The lowering guide 120 is configured to direct the fruiting wire and cordon at or below the ground level as the fruiting wire and cordon exits the second longitudinal end 124. The second longitudinal end 124 is positioned lower than the first longitudinal end 122 so that the second longitudinal end 124 can be received into the trench.

Figure 3:
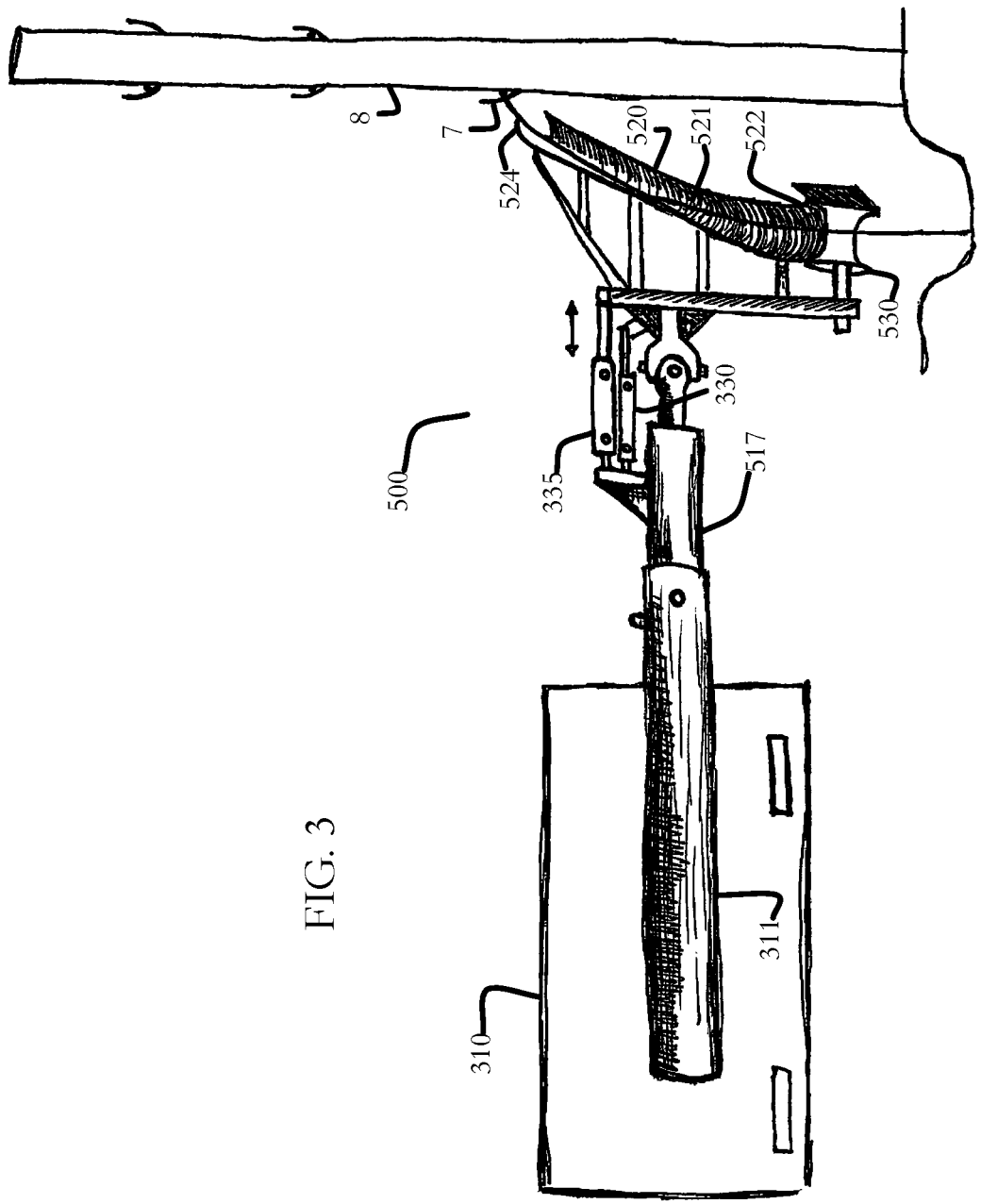
FIG. 3 depicts a front perspective of an embodiment of the implement for raising the fruiting wire with the vine portion attached thereto.

In one embodiment, an elongated conduit 126 defines the longitudinal wire pathway. The conduit 126 extends between the first longitudinal end 122 and the second longitudinal end 124. The conduit can cooperate with line guides, as is shown in FIG. 3. The conduit can also receives and guides the fruiting wire and cordon between the first longitudinal end 122 and the second longitudinal end 124 without use of the a line guide.

Figure 4:
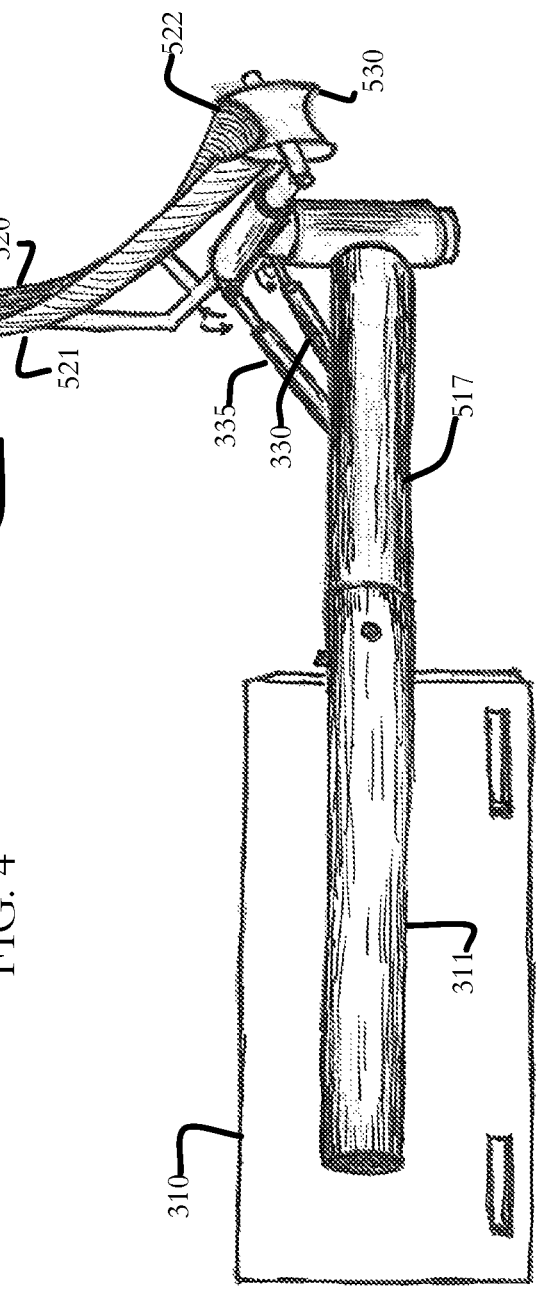
FIG. 4 is a front perspective view of the implement of FIG. 3.

Preferably, the conduit 126 is partially enclosed and has an arcuate cross section. As such, the conduit 126 has an open portion. As illustrated in FIGS. 3 and 4, the open portion can comprise 50% of the circumference of the conduit. In other embodiments, the conduit 126 can have a base with two sidewalls extending between open distal ends. The conduit may also have a U-shaped, V-shaped, or C-shaped cross section. The conduit 126 has a sufficiently shallow depth to allow the vine trunk to remain attached to the vine cordon as the fruiting wire and cordon pass through the longitudinal wire pathway. This depth must be sufficient to engage the fruiting wire with the cordon attached without interfering with the ability of the vine trunk to pass through the open portion of the conduit. Existing fruiting wire engaging mechanisms, such as the method and apparatus for stripping material from a line disclosed in U.S. Pat. No. 8,322,123 to George et al., employ deep channel guides that would damage the trunk if the trunk were to remain attached to the wire as it passes through the apparatus.

In order to deposit the fruiting wire—with the vine cordon attached thereto—into the trench, the open portion of the elongated conduit is disposed on a lower portion of the elongated conduit at the second longitudinal end. The open portion can comprise up to 50% of the circumference of the conduit. Therefore at the second longitudinal end, the open portion may comprise the lower 50% of the conduit cross section. In another embodiment, the open portion is oriented partially downward and—when mounted to the tractor—orientated partially toward the trellis. For a more detailed explanation, the cross section may be compared to a clock face, where 3 o'clock is toward the tractor, 6 o'clock is oriented downward, 9 o'clock is oriented toward the trellis, and 12 o'clock is oriented upward. In one embodiment, the open portion at the second longitudinal end corresponds to the lower position between 3 o'clock to 9 o'clock. Alternatively, the open portion at the second longitudinal end may be positioned between 4 o'clock and 10 o'clock, or between 5 o'clock and 11 o'clock. In order to receive the raised portion of the fruiting wire at the first longitudinal end, the open portion may be in an upwards orientation—towards 12 o'clock—or laterally disposed toward the 9 o'clock position. In a preferred embodiment, the open portion twists along the longitudinal length of the elongated conduit from a lateral orientation at the first longitudinal end to a lower orientation at the second longitudinal end.

The elongated conduit 126 guides the fruiting wire 9 down at or below ground level, such as into a trench. The first longitudinal end 122 receives the raised fruiting wire and then exerts a downward force on the fruiting wire. In this way, the implement pushes the fruiting wire 9 down into the trench. The orientation of the elongated conduit is such that the first longitudinal end is higher and laterally offset such that it is spaced further away from the tractor than the second longitudinal end. As such, the first longitudinal end is disposed closer to the trellis than the second longitudinal end.

In another embodiment, the lowering guide 120 comprises a line guide. The line guide has a trough shaped member that is rotatable about a horizontal axis. A first line guide is mounted to the lowering guide frame at the first longitudinal end and configured to engage the fruiting wire and cordon from below. In this way, the first line guide receives the fruiting wire with cordon attached from a position where the fruiting wire is mounted to the trellis or where the fruiting wire is suspended above the ground level and supported by the vine trunks. A second line guide is mounted to the lowering guide frame at the second longitudinal end and is configured to engage the fruiting wire and cordon from above. In this way, the second line guide guides the fruiting wire with cordon attached from the first line guide downward. The second line guide can be mounted such that—when mounted to the tractor—the second line guide can be positioned within the trench. In this embodiment, the longitudinal wire pathway is defined by the first line guide and the second line guide.

In another embodiment, the lowering guide 120 comprises a plurality of guiding elements that are not continuous. For example, in place of a continuous, longitudinally extended conduit, the lowering guide comprises a plurality of conduit portions as guiding elements. Each guiding element receives and guides the fruiting wire downward.

In another embodiment, a lateral pitch adjustment is provided to adjust the lateral offset of at least one of the first line guide and the second line guide. The lateral position of the line guide can be adjusted using a powered actuator. The actuator, acting through linkage between the line guide and the lowering guide frame, causes the line guide to move laterally inward or outward relative to the lowering guide frame. Preferably, the powered actuator is operably connected to the standard hydraulics on the tractor's powered arm. In this way, the operator can control the position of the line guide from the tractor seat. Preferably, the actuator is a hydraulic actuator operably connected to the tractor's hydraulic supply. A variety of alternative actuators are contemplated, such as an electrical linear motor, electrical stepper motor, an electric solenoid, etc., and may act upon the sliding bracket by either pulling or pushing. Alternatively, the actuator may be a piston that is pneumatic, fluidically, or hydraulically positioned to act upon an actuator. The action of the actuator can be operator-generated, mechanically-generated, electronically-generated, or programmatically generated and transmitted by any effective means, such as via cable, rope, strap, magnetic-induction, or other linear actuator or force transmitter. The actuator action can also be generated by fluid power, such as hydraulic, pneumatic, or other energizing force that is in communication with the sliding bracket. A pneumatic or fluid source of a selected regulated pressure may actuate a single or multiple actuators. One or more respective supply lines connects the pneumatic or fluid source—such as the tractor's hydraulic system—with the respective actuator. Optionally, the line guide can have a second powered actuator. The second powered actuator can control the vertical orientation of the line guide. The second powered actuator, acting through linkage between the line guide and the lowering guide frame, causes the line guide to move vertically upward or downward relative to the lowering guide frame.

The implement can be fitted with an excavating assembly 210 capable of forming a trench 200 that is parallel to the elevated fruiting wire 9. In this way, the implement can form the trench 200 in the same pass along the length of the trellis system as guiding the fruiting wire 9 into the trench 200. Otherwise, the operator would have to make two passes along the length of the trellis system, the first to create the trench and the second to guide the fruiting wire into the trench. As illustrated in FIG. 2, the excavating assembly can be a plurality of discs. Alternatively, the excavating assembly could be a single disc, plough blade, auger, or a rotating brush depending on the type of soil to be excavated.

The implement can also be fitted with a backfill assembly 600 configured to cover the fruiting wire with soil. In this way, the implement can bury the fruiting wire as the second longitudinal end of the elongated conduit maintains the fruiting wire at an appropriate depth within the trench. As illustrated in FIG. 2, the backfill assembly 600 can be a single blade. Alternatively, the backfill assembly 600 could be a box scraper, grader, rake, drum, auger, or rotating brush depending on the type of soil used for backfilling.

Since the vine remains attached to the fruiting wire as the pivot arm, fruiting wire, and cold-sensitive portion of the vine rotate together into a trench in the ground, the vine needs to be able to make the transition from the growing position to the buried position without unnecessary damage to the vine. As shown in FIG. 1, the rootstock can be planted at an acute angle relative to the ground to reduce the stress of burying the vine. By planting the vine at an acute angle relative to the ground, the stress to transfer the vine from an upright position to a buried position is reduced. The angle of the rootstock relative to the ground can be between 35-55°, preferably the angle is between 40-45°. In a preferred embodiment, the vine is grown using both the acute angle planting and the elevated grafting height. In this embodiment, the cold-tolerant rootstock 20 grows at a 40-45 degree angle to the ground and extends upward to the fruiting wire 9. As such, the cold-tolerant rootstock portion 20 would be four feet long when planted at a 40-45 degree angle and grafted near the height of a standard three feet tall fruiting wire.

Preferably, the mounting bracket 115 is configured to receive a three-point hitch. The connections are known in the art, and will not be discussed.

Preferably, the elongated conduit is comprised of a synthetic plastic polymer, such as polyvinyl chloride (PVC). However, it can be comprised of a variety of durable material that will guide the fruiting wire.

Optionally, as shown in FIG. 3, a front-wire-guide element 300 can be fitted to the tractor in cooperation with the lowering guide 100. The front-wire-guide element is configured to be mounted to a tractor. Preferably, the front-wire-guide element 300 has a mount 310 that is configured to receive the power arm of a tractor. The connections are known in the art and will not be discussed.

The front-wire-guide element 300 makes initial contact with the fruiting wire 9, to position the fruiting wire appropriately for engagement with the lowering guide 100. The front-wire-guide element 300 has a front guiding element 320.

The lateral position of the front-wire-guide element 300 can be adjusted using a first powered actuator 330. The actuator, acting through linkage between the front guiding element 320 and the front mount 310, causes the front guiding element 320 to move laterally inward or outward relative to the front mount 310.

Preferably, the first powered actuator 330 is operably connected to the standard hydraulics on the tractor's powered arm. In this way, the operator can control the lateral and vertical position of the front-wire-guide element 300 from the tractor seat. In that way, the operator can adjust the position of the front-wire-guide element 300 to maintain contact with the fruiting wire 9 without moving the tractor from a straight-line driving orientation.

Preferably, the actuator is a hydraulic actuator operably connected to the tractor's hydraulic supply. A variety of alternative actuators are contemplated, such as an electrical linear motor, electrical stepper motor, an electric solenoid, etc., and may act upon the sliding bracket by either pulling or pushing. Alternatively, the actuator may be a piston that is pneumatic, fluidically, or hydraulically positioned to act upon an actuator. The action of the actuator can be operator-generated, mechanically-generated, electronically-generated, or programmatically generated and transmitted by any effective means, such as via cable, rope, strap, magnetic-induction, or other linear actuator or force transmitter. The actuator action can also be generated by fluid power, such as hydraulic, pneumatic, or other energizing force that is in communication with the sliding bracket. A pneumatic or fluid source of a selected regulated pressure may actuate a single or multiple actuators. One or more respective supply lines connects the pneumatic or fluid source—such as the tractor's hydraulic system—with the respective actuator.

Optionally, the front-wire-guide element 300 can have a second powered actuator 335. The second powered actuator 335 can control the vertical orientation of the front guiding element 320. The second powered actuator 335, acting through linkage between the front guiding element 320 and the front mount 310, causes the front guiding element 320 to move vertically upward or downward relative to the front mount 310.

In the fall—when the fruiting wire with the scion attached needs to be buried—the fruiting vines that extend vertically upwards from the fruiting wire can be cut from the portion of the vine that is attached to the fruiting wire. The upward vines 400 can be cut above the fruiting wire 9 with a hydraulic cutting element 410. In a preferred embodiment, the hydraulic cutting element 410 can be interchangeably mounted to the front mount 310.

Figure 5:
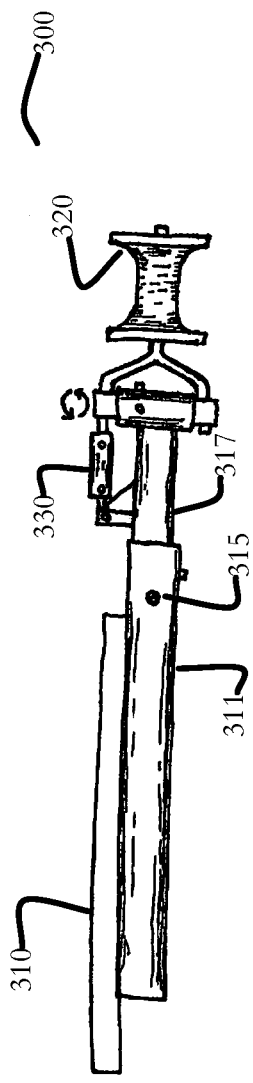
FIG. 5 depicts a front perspective view of an embodiment of the front guide element.
Figure 6:
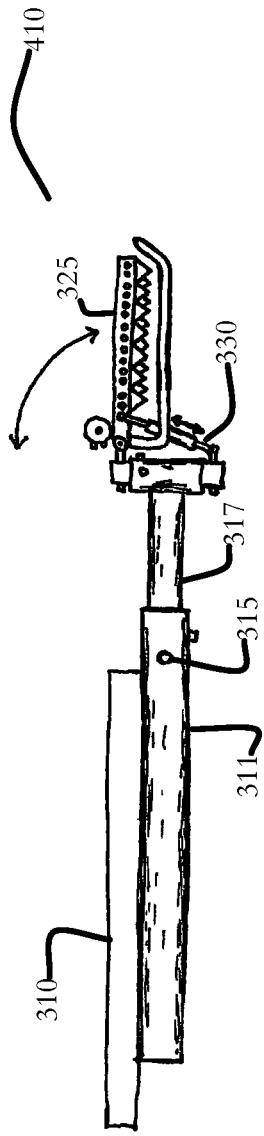
FIG. 6 depicts a front perspective view of an embodiment of the hydraulic cutting element.
Figure 7:
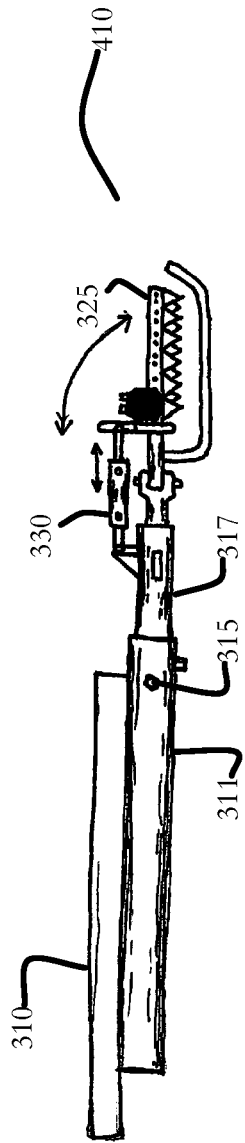
FIG. 7 depicts a front perspective view of a second embodiment of the hydraulic cutting element.
Figure 8:
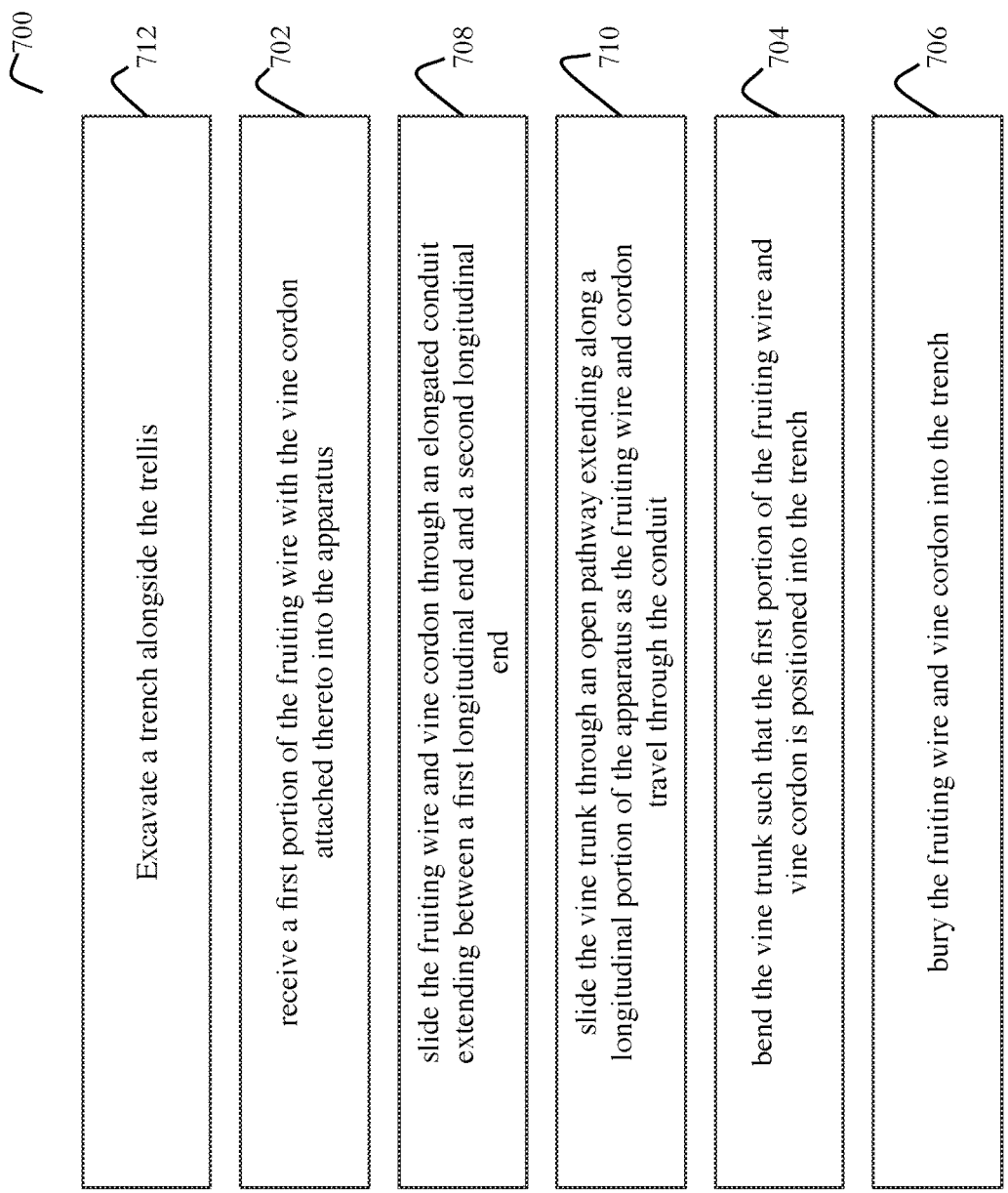
FIG. 8 is a flow diagram of a method of burying a longitudinally extended fruiting wire with a vine cordon attached thereto in a trench with the vine trunk remaining attached to the vine cordon.

The front mount 310 is configured to receive a variety of elements, such as the front-wire-guide element 300 or the hydraulic cutting element 410. The front mount 310 has a receiver 311 that receives a shaft 317. The shaft 317 is securely mounted within the receiver 311 with a fastener 315. As illustrated in FIG. 5, the shaft 317 is preferably round. As such, the elements can be pivoted about the longitudinal axis of the shaft 317 and then secured by tightening the fastener 315.

In the spring—when the fruiting wire 9 with the scion attached needs to be lifted—the first end trellis post 5 with the pivot arm 10 is returned to a substantially upright position. A raising implement 500 is attached to a tractor. As illustrated in FIG. 3, the raising implement 500 has a raising guide 520 that receives the fruiting wire 9 and lifts the fruiting wire—with the scion attached—from its buried position. The raising guide 520 has a lower end 522 and a raised end 524. The raising guide 520 is mounted to a frame 510. The frame is mounted to a shaft 517, which can be received by the universal receiver 315 described above. The raising guide can have an elongated conduit 521 disposed between the lower end 522 and the raised end 524. The raised end 524 is positioned higher than the lower end 522 so that the raising guide 520 receives and guides the fruiting wire 9 from a buried position to a raised position. In the raised position, the fruiting wire 9 can be received by the support member 7 on a center trellis post 8.

As the tractor drives along the length of the fruiting wire, the wire passes through the raising line guide from the lower end 522 and is lifted to the raised end 524. The raised end 524 is positioned laterally further from the shaft than the lower end 522.

In order to aid the lifting of the fruiting wire 9 from its buried position, the raising element can incorporate a front guide element 530. The front guide element 530 is illustrated in FIG. 3 as a roller with a trough shaped cross section.

In order to return the fruiting wire 9 to its raised growing position, the operator raises the powered end of the tractor to position the raised end 524 at or near the height of the support members 7 of the central trellis posts 8. As such, the implement lifts the fruiting wife from its buried position and guides the fruiting wire onto the support members 8 of the central trellis posts.

The trellis system comprises at least two end posts 5 with one or more central posts 8 disposed between the end posts 5. The fruiting wire 9 is a taut, horizontal wire for supporting the vine that extends between the end posts. Both the central posts and the end posts are anchored to the ground to provide a secure vertical support for the vine and the support wires, including the fruiting wire 9.

Also described is a kit for moving a fruiting wire between an elevated position on a trellis and a lowered position in a trench. The kit has a front line guide, a lowering guide, and a raising guide. The kit can also have an excavating assembly and a backfill assembly.

In another embodiment, the same implement is used for both lowering and raising the fruiting wire and vine. The implement is attached to a tractor in a lowering configuration. In the lowering configuration, the first line guide receives the fruiting wire. The first line guide can remove the wire from the support member. The second line guide is lower than the first line guide. As the tractor drives along the length of the fruiting wire, the wire passes over the first raised line guide and the wire descends to the second line guide. The first line guide can remove the wire from the support member. In the raising configuration, the first line guide receives the fruiting wire and lifts the fruiting wire—with the scion attached—from its buried position. The second line guide is positioned higher than the first line guide. As the tractor drives along the length of the fruiting wire, the wire passes over the first raised line guide and is lifted to the second line guide. The second line guide is generally disposed at or near the height of the support members of the central trellis posts. As such, the implement lifts the fruiting wife from its buried position and guides the fruiting wire onto the support members of the central trellis posts.

The apparatus further comprising a lowering orientation where the first line guide is configured to guide the fruiting wire upward and the second line guide is configured to guide the fruiting wire vertically downward and laterally inward; and a raising orientation where the first line guide is configured to guide the wire upward from a trench and the second line guide is configured to guide the fruiting wire vertically upward and laterally outward. The frame can also be pivotable about a lateral axis to transition the apparatus between the lowering orientation and the raising orientation.

In one embodiment, the trellis system for growing crops comprises: at least two end posts that are spaced apart and anchored to the ground; a fruiting wire extending laterally between and attached to the at least two end posts; a central post that is disposed between the at least two end posts and is anchored to the ground and having a first support member for receiving the fruiting wire; a pivot arm that has a fixed end that is pivotally mounted to the end post such that an adjustable end of the pivot arm with a second support member that can pivot from a substantially upright position to a position where the adjustable end of the pivot arm can be received into a trench in the ground adjacent to the end post; and whereby the pivot arm is secured in a substantially upright position when the fruiting wire is received by both the first support member of the end post and the second support member of the pivot arm.

In one embodiment, the trellis for pivoting a fruiting wire without removing the vine, comprising an end post that is anchored to the ground and substantially upright, the end post comprising; a first support member for receiving the fruiting wire; a pivot arm pivotally attached to the end post such that the pivot arm is capable of rotating from a substantially upright position to a position that is at an obtuse angle relative to the end post, comprising: a second support member for receiving the fruiting wire; when the fruiting wire is received by both the first support member of the end post and the second support member of the pivot post the pivot arm is secured in a substantially upright position; and when the fruiting wire is removed from the first support member of the central post the pivot arm is capable of rotating toward the ground with the fruiting wire without removing the vine. The trellis can also be configured to selectively receive the fruiting wire thereby allowing the pivot arm to pivot relative to the central arm. The trellis can also comprise the vine having a less cold-tolerant portion that is secured to the fruiting wire; and a more cold-tolerant portion that extends between the ground and the fruiting wire. The trellis can further comprise the vine having been planted at an acute angle relative to the ground thereby enabling the scion to remain attached to the fruiting wire as the pivot arm rotates into a trench in the ground, the trench being parallel to the fruiting wire and laterally spaced apart from the central post.

In one embodiment, the innovation can be a system for growing a vine, comprising: a trellis comprising an end post that is anchored to the ground and substantially upright, the end post comprising a first support member for receiving the fruiting wire; a pivot arm pivotally attached to the end post such that the pivot arm is capable of rotating from a substantially upright position to a position that is at an obtuse angle relative to the end post, comprising a second support member for receiving the fruiting wire; when the fruiting wire is received by both the first support member of the end post and the second support member of the pivot post the pivot arm is secured in a substantially upright position; and when the fruiting wire is removed from the first support member of the central post the pivot arm is capable of rotating toward the ground with the fruiting wire without removing the vine; and the vine having: a less cold-tolerant portion that is secured to the fruiting wire; a more cold-tolerant portion that extends between the ground and the fruiting wire; an implement for raising and lowering the fruiting wire between an elevated position and a lowered position comprising: an excavating assembly capable of forming a trench that is parallel to the elevated fruiting wire; a line guide that is generally trough shaped for positioning the fruiting wire therein, the line guide having an elevated end and a lowered end for guiding the line between the elevated position and the lowered position; and a backfill assembly configured to cover the fruiting wire with soil. The vine is planted at an acute angle relative to the ground thereby enabling the vine to remain attached to the fruiting wire as the pivot arm, fruiting wire, and cold-sensitive portion of the vine rotate together into a trench in the ground, whereby the cold-sensitive portion of the vine can be protected from cold temperatures by being covered.

What is claimed is:

1. An apparatus for burying a longitudinally extended fruiting wire with a vine cordon attached thereto into a trench where the vine trunk remains attached to the cordon, the apparatus comprising:
   a) a lowering guide configured to receive a first portion of the fruiting wire with the vine cordon attached thereto and further configured to bend the vine trunk attached to the vine cordon such that the first portion of the fruiting wire and vine cordon is positioned into the trench the lowering guide further comprises:
      i) a first longitudinal end configured to receive a portion of the fruiting wire and cordon;
      ii) a second longitudinal end configured to direct the portion of the fruiting wire and cordon into the trench;
      iii) a longitudinal wire pathway extending between the first longitudinal end and the second longitudinal end of the lowering guide;
      iv) an open pathway extending along the longitudinal wire pathway configured for the trunk of the vine attached to the cordon as the fruiting wire and cordon travel through the longitudinal wire pathway
      v) a first line guide having a trough shaped member rotatable about a horizontal axis and disposed at the first longitudinal end; and
      vi) a second line guide having a trough shaped member rotatable about a horizontal axis and disposed at the second longitudinal end; and
   b) a backfill assembly disposed adjacent to the lowering guide for burying the fruiting wire and cordon.

2. The apparatus of claim 1, wherein the lowering guide further comprises an elongated conduit that is partially enclosed and defines the longitudinal wire pathway.

3. The apparatus of claim 2, wherein the elongated conduit has an arcuate cross section.

4. The apparatus of claim 3, wherein the elongated conduit has a sufficiently shallow depth relative to the open pathway to allow the vine trunk to remain attached to the cordon as the fruiting wire and cordon pass through the wire pathway.

5. The apparatus of claim 1, therein the first longitudinal end is laterally offset to engage and receive the portion of the fruiting wire and cordon.

6. The apparatus of claim 1, wherein the first line guide is configured to engage the fruiting wire and cordon from below and the second line guide is configured to engage the fruiting wire and cordon from above and wherein the longitudinal wire pathway is defined thereby.

7. The apparatus of claim 6, further comprising an adjustable mount, wherein the adjustable mount comprises:
   a) a lateral pitch adjustment capable of adjusting the lateral offset of at least one of the first line guide and the second line guide.

8. A method of using an apparatus to bury a longitudinally extended fruiting wire with a vine cordon attached thereto in a trench with the vine trunk remaining attached to the vine cordon, the method comprising the steps of:
   a) receiving a first portion of the fruiting wire with the vine cordon attached thereto into the apparatus;
   b) bending the vine trunk such that the first portion of the fruiting wire and vine cordon is positioned into the trench; and
   c) burying the fruiting wire and vine cordon into the trench.

9. The method of claim 8, further comprising the step of excavating the trench.

10. The method of claim 9, further comprising the step sliding the fruiting wire and vine cordon through an elongated conduit extending between a first longitudinal end and a second longitudinal end.

11. The method of claim 10, further comprising the step of sliding the vine trunk through an open pathway extending along a longitudinal portion of the apparatus as the fruiting wire and cordon travel through the conduit.

* * * * *